Patented Oct. 8, 1929

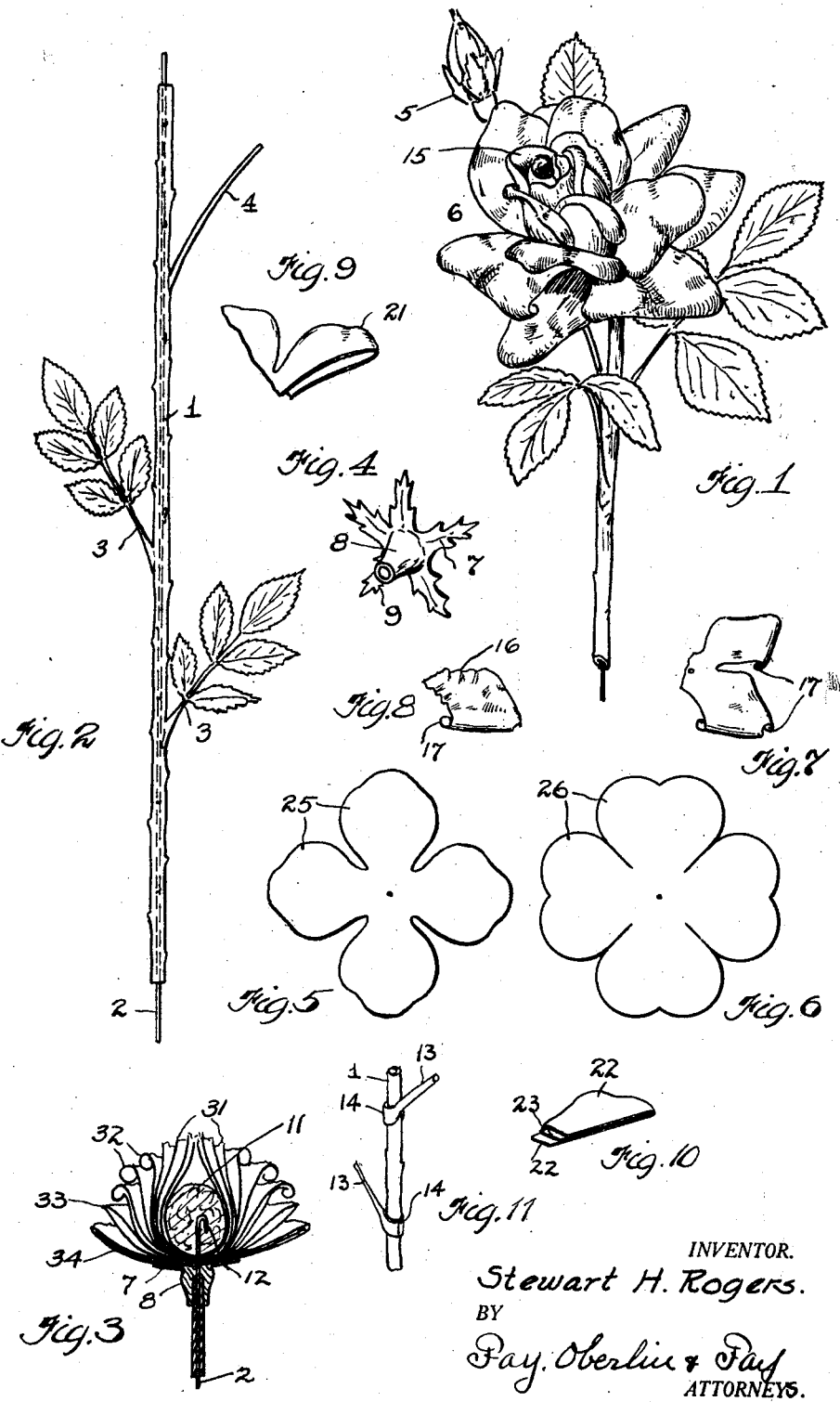

1,730,628

UNITED STATES PATENT OFFICE

STEWART H. ROGERS, OF CLEVELAND, OHIO

ARTIFICIAL FLOWER AND METHOD OF MAKING SAME

Application filed March 7, 1927. Serial No. 173,400.

This invention relates as indicated to artificial flowers and a method of making the same. More particularly it comprises making the several individual parts of a flower out of rubber and thereafter assembling the same so as to present the appearance and characteristics of a natural flower of which it is an artificial counterpart.

Heretofore in the production of artificial flowers, particularly those formed of rubber, difficulty has been experienced in giving to the petals and other portions of the structure a natural effect such as the curled edge of the outer petals, the crinkly edge of the inner petals, the spread of the lower series of petals and the striations and serrations of the leaves and like parts. This is due largely to the fact that the rubber used is thin sheet rubber which has been cured and which is changed in form with extreme difficulty. It has heretofore been attempted to cement the rubber at points to hold it in various set forms, but this involves a large amount of labor and is not always successful for the reason that if too great an amount of cement is used, the effect is not that desired and if too little is used, the parts are frequently released before the flower has served the purpose for which it was intended.

The present invention has in view the avoiding of the difficulties referred to and the provision of a flower constructed almost entirely of rubber which will have to a high degree the characteristic physical appearance of a natural flower. Another object of the invention is to simplify the construction and assembly of the various units which go to make up a flower and its stem to the end that quantity production may be reached without detracting from the artistic finish of the product. Another object of the invention is to provide a method of molding the stem and leaf branches of a flower in substantially a singe plane and thereafter turning the branches and associated parts through an angle of 90° and curing the entire structure so that a permanent set will be taken by the parts in the natural flower position to which they are adjusted.

Another object of the invention is to provide for a stem assembly, a culot, calyx and a plurality of petals which may readily be joined in permanent relation so as to present an ornamental artificial flower which will have a close resemblance in all important details to a natural flower. Other and further objects of the invention will appear in the course of the following description. To the accomplishment of the foregoing and related ends, said invention, then consists of the means hereinafter fully described and particularly pointed out in the claims.

The annexed drawing and the following description set forth in detail a method and structure exemplifying the invention, such disclosed procedure and structure constituting however, but several of various applications of the principle of the invention.

In said annexed drawings:

Fig. 1 is a side elevation of a flower and stem assembly embodying the principles of my invention; Fig. 2 is a side elevation of a stem and associated parts as molded; Fig. 3 is a central vertical sectional view of a flower embodying the principles of my invention; Fig. 4 is a perspective view of a calyx and culot forming part of my invention; Fig. 5 is a plan view of a petal unit of a type preferable for forming the outer petals; Fig. 6 is a plan view of another form of petal unit of a type suited for inner petal units; Fig 7 is a fragmentary perspective view showing the manner of curling the edges of the rubber petals; Fig 8 is a fragmentary perspctive view of a crinkled and curled rubber petal; Fig. 9 is a perspective view partly in section showing an air filled rubber petal; Fig. 10 is a fragmentary perspective view showing a rubber petal reinforced with paper; and Fig. 11 is a fragmentary perspective view showing a method of joining an inserted branch to the main stem.

As is clearly shown in Fig. 1 of the drawing, a typical flower assembly comprises a central stem 1 perefrably formed of molded rubber and having a reinforcing wire 2 extending through the same, said stem being provided with a plurality of branches 3, carrying leaves and preferably with one branch 4 carrying a bud 5 additional to the main flower 6, which is mounted directly at the top of the central stem. The flower as well as the bud are each mounted within a calyx 7 which is formed integrally with a culot 8 which is connected with the stem. The several parts are preferably united by cement, the culot having a socket 9 to receive the upper end of the central stem. The central wire may also be used to hold the parts assembled as will be hereinafter described.

The method of forming the stem is illustrated in Figs. 1 and 2 of the drawing. The stem with its associated parts is molded of uncured rubber so as to produce the stem and its leaves and auxiliary branches in substantially a single plane. The branches are turned to a position at right angles and the stem assembly is then cured to maintain the parts permanently in such natural position to which they have been adjusted.

With the stem assembly prepared as indicated, the calyx and culot are secured to the upper end of the stem by cement and the assembled petal group of the flower is also secured in position. This may be accomplished by inserting the center wire of the stem through the culot and calyx and central portion or cotton ball 11 of the flower and thereafter forming a crimp 12 at the end of said wire so as to prevent its withdrawal. The assembled flower may also be held in position by means of cement between each of its parts with the lower petal unit cemented to the calyx.

In addition to showing the flower on the main stem, Fig. 1 shows a bud secured to a branch stem adjacent the full blown flower. In the event a bud is used, the mounting of stem for such bud may be formed at the time the main portion of the stem assembly is molded, and the bud may be cemented to the top of the branch stem exactly as in the case of the flower above described. However, it is often desired to place the bud in some particular position, and in such case a separate stem 13 of uncured rubber is used, said stem having a divided lower end 14 (see Fig. 12) which is wrapped about the main stem and thereafter cured to maintain it in position. If the bud stem is cured before attaching to the main stem cement may be used to hold the parts united.

The culot and calyx are preferably formed integrally of uncured rubber which is cured after being given the proper shape. The construction of the petals will now be explained. The inner petals 15 are preferably formed of single layers of thin sheet rubber of suitable tint and the outer marginal portions thereof are preferably crimped or curled or both crimped and curled in the manner of a natural flower. In order to hold the crimps 16 and curls 17 in the outer marginal edge, it is found desirable to use a sheet of uncured rubber and after forming the curl by rolling the corners along intersecting axes (see Fig. 7) subject the same to a curing process. In addition to curling the extreme edge of the petal, it may be found desirable as indicated to crimp or crinkle the lateral edges thereof (see Fig. 8). This is readily done by pressing the edges or by drawing outwardly at spaced intervals along the outer margin of the uncured rubber sheet so as to stretch the fabric at spots thus producing a decided crinkled effect. The curing process is then applied and serves to hold the parts in position.

In order to produce a petal suitable for a bud or for a circumferential petal series of a flower, which will have a crinkled effect and at the same time have adequate body to maintain its position, the petal 21 may be formed of two layers of uncured rubber which are joined at their margins and are pulled apart prior to such closure so as to include a small quantity of air. Thus the inclosed air will cause the thin rubber to assume a crinkled appearance such as will give a very natural effect to the petal. In addition stretching and curling of the margins may be resorted to before curing the elements.

In order to provide for certain of the petals retaining a rigid outwardly extending position about the flower, the petals 22 may be formed of two layers of uncured rubber between which is inserted a layer 23 of paper or fabric which will serve to hold the petal in fully extended position.

The petals have been described individually, but in practice preferably are formed in a group with petals 25, (see Fig. 5) at spaced intervals about the center. They may also be formed of sheets cut to suitable outline and slitted along radial lines to provide petals 26 which may be overlapped to assume cuplike form so as to interfit with similarly formed series of progressively increasing or decreasing size and form a complete flower unit when assembled.

It is to be understood that in forming the flower, petal units of single thickness or of double thickness either air filled or supported by paper or fabric, will be selected in accordance with the part of the flower being formed, the inner portion of the flower (see Fig. 3) preferably being formed of single layer petals 31 with crinkled edges and outside of them with single layer petals 32 having curled or curled and crinkled edges and the intermediate portion of air filled petals 33 and the outer portion of reinforced petals 34. In some instances only one of the types of petals will be incorporated in the flower or the order or number of types of petals may be changed to suit the particular character of the flower under construction.

Other forms may be employed embodying the feature of my invention instead of those here explained, change being made as regards the form of construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. A method of producing a stem assembly for an artificial flower which comprises molding a main stem and auxiliary stems with leaves connected therewith in a single plane, removing said molded stem assembly from the mold, turning the auxiliary stems and leaves at right angles to their molded position, and subjecting the stem assembly to curing acting to fix the parts in the position last stated.

2. A method of producing an artificial flower which comprises molding a stem assembly and curing the same with the leaves and auxiliary stems at angles other than that of a single plane passing through the main stem, producing a flower unit calyx and culot integrally by individually molding said parts and curing the same in final position and assembling said last named parts upon the top of said main stem.

3. A method of producing an artificial flower which comprises producing a molded stem and associated parts of uncured rubber, shaping the same to assume the characteristics of a natural flower, attaching to said stem a branch stem formed of uncured rubber and split at the bottom by wrapping about said main stem the respective ends of said branch stem and thereafter subjecting said entire structure to curing action to permanently fix said parts in adjusted position.

4. The method of producing an artificial flower of rubber which comprises forming a main stem and associated parts with a wire embedded centrally of said main stem, assembling a flower unit of nested petal units about a ball of light material, seating said flower unit in an integral calyx and culot upon the upper end of said main stem and extending said embedded wire through said associated parts into said ball and crimping said wire to prevent withdrawal.

5. A method of producing an artificial flower of rubber which includes the step of forming each petal of uncured rubber shaping said petal by curling or stretching at spaced points about its margin to present a curled or crinkled appearance and thereafter subjecting said petal to curing action to maintain said curled or crinkled effect.

6. A step in the method of producing an artificial flower of rubber which comprises joining an auxiliary stem to a main stem by splitting the lower end of said auxiliary stem and wrapping the parts thereof about said main stem and securing said parts in permanent connection with said main stem.

7. An artificial flower construction comprising a main stem having branch stems and associated parts formed of rubber, an integral calyx and culot of molded rubber secured to the upper end of said main stem, and a flower unit comprising a plurality of nested petal units formed of sheet rubber secured within said calyx.

8. An artificial flower unit comprising a plurality of petal units having petals formed of suitably tinted, sheet rubber shaped to imitate a natural flower, said petal units being nested together and secured within a rubber calyx, a culot formed integrally with said calyx and provided with means for attaching the same to the upper end of a stem.

9. An artificial flower comprising a petal section having petals formed of suitably tinted sheet rubber shaped to resemble a natural flower, and other petal units formed of double layer portions of sheet rubber enclosing a small body of air under atmospheric pressure, and means for holding said petals in assembled relation.

10. An artificial flower comprising a petal section having petals formed of suitably tinted sheet rubber shaped to resemble a natural flower, and other petal units formed of double layer portions of sheet rubber enclosing a stiffening member.

11. An artificial flower comprising a petal section having petals formed of suitably tinted sheet rubber shaped to resemble a natural flower, and other petal units formed of double layer portions of sheet rubber enclosing respectively a small body of air under atmospheric pressure, and stiffening means, and means for mounting said petals upon a calyx and for securing said calyx to a stem.

12. A petal for an artificial flower comprising two layers of sheet rubber suitably tinted and joined at their marginal edges and having a central portion partially filled with air under atmospheric pressure and shaped to resemble a natural flower petal.

13. A petal for an artificial flower comprising two layers of sheet rubber of substantially similar shape and size having their marginal edges cemented and having a stiffening member interposed between said sheets.

Signed by me this 21st day of February, 1927.

STEWART H. ROGERS.